(12) United States Patent
Jumas et al.

(10) Patent No.: US 7,794,884 B2
(45) Date of Patent: Sep. 14, 2010

(54) NEGATIVE ELECTRODE FOR LITHIUM BATTERIES

(75) Inventors: Jean-Claude Jumas, Jacou (FR);
Josette Olivier-Fourcade, Jacou (FR);
Pierre-Emmanuel Lippens, Sant Aunes (FR); Laurent Aldon, Montpellier (FR);
Aurélie Picard, Sète (FR); Pierre Kubiak, Montpellier (FR)

(73) Assignees: Umicore, Brussels (BE); Universite Montpellier II, Montpellier Cedex (FR)

( * ) Notice: Subject to any disclaimer, the term of this patent is extended or adjusted under 35 U.S.C. 154(b) by 1046 days.

(21) Appl. No.: 10/555,882

(22) PCT Filed: Apr. 26, 2004

(86) PCT No.: PCT/EP2004/004503

§ 371 (c)(1),
(2), (4) Date: Aug. 11, 2006

(87) PCT Pub. No.: WO2004/100292

PCT Pub. Date: Nov. 18, 2004

(65) Prior Publication Data

US 2007/0042273 A1 Feb. 22, 2007

Related U.S. Application Data

(60) Provisional application No. 60/470,209, filed on May 14, 2003.

(30) Foreign Application Priority Data

May 9, 2003 (EP) .................................. 03291107

(51) Int. Cl.
*H01M 6/18* (2006.01)
(52) U.S. Cl. ..................................... 429/322; 29/623.1

(58) Field of Classification Search .................. 429/322
See application file for complete search history.

(56) References Cited

FOREIGN PATENT DOCUMENTS

| JP | 2001 185141 A | 7/2001 |
|---|---|---|
| WO | WO 03/030283 | 4/2003 |

OTHER PUBLICATIONS

A. D. Robertson, Li1+xFe1-3xTi1+2xO4 (0.0≦x≦.33) Based Spinels: Possible Negative Electrode Materials for Future Li-Ion Batteries, Journal of the Electrochemical Society, 146 (11) 3958-3962 (1999).*

(Continued)

*Primary Examiner*—Patrick Ryan
*Assistant Examiner*—Brent Thomas
(74) *Attorney, Agent, or Firm*—Brinks, Hofer, Gilson & Lione

(57) ABSTRACT

An active material for high-voltage negative electrodes (>1V vs. Li) of secondary rechargeable lithium batteries is disclosed. Chemical composition is represented by the general formula $Li_{2+v}Ti_{3-w}Fe_xM_yM'_zO_{7-\alpha}$, where M and M' are metal ions having an ionic radius between 0.5 and 0.8 A and forming an octahedral structure with oxygen, like $Ti^{3+}$, $Co^{2+}$, $Co^{3+}$, $Ni^{2+}$, $Ni^{3+}$, $Cu^{2+}$, $Mg^{2+}$, $A^{/3+}$, $In^{3+}$, $Sn^{4+}$, $Sb^{3+}$, $Sb^{5+}$, $\alpha$ is related to the formal oxidation numbers n and n' of M and M' by the relation $2\alpha=v+4w-3x-ny-n'z$ and the ranges of values are $-0.5 \leq V \leq 0.5$, $0 \leq w \leq 0.2$, $x>0$, $y+z>0$ and $x+y+z \leq 0.7$. The structure is related to that of ramsdellite for all the compositions. The negative active material is prepared by ceramics process wherein lithium oxide, titanium oxide, iron oxide, M and/or M' oxide are used as starting material for synthesis. Inorganic or organic solid precursors of the oxides can also be used instead. After reactant dispersion the mixture is fired. The resulting electrochemically active material provides low working voltage and capacity with excellent cycling capabilities at both low and high current densities.

12 Claims, 5 Drawing Sheets

OTHER PUBLICATIONS

Arroyo, M.E., et al. "Electrochemical Lithium Intercalation in $Li_2Ti_3O_7$-Ramsdellite Structure", Materials Research Bulletin, 1997, p. 993-1001, vol. 32, No. 8.

Ferg, E. et al., "Spinel Anodes for Lithium-Ion Batteries", J. Electrochem. Soc., 1994, pp. L147-L150, vol. 141, No. 11.

Garcia-Alvarado, F., et al., "New electrode materials for lithium rechargeable batteries", Journal of Power Sources, 1999, pp. 85-89, vol. 81-82.

Garnier, S., et al., "Electrochemical intercalation of lithium into the ramsdellite-type structure of $Li_2Ti_3O_7$", Solid State Ionics, 1996, pp. 323-332, vol. 83.

Gover, R.K.B., et al., "Investigation of Ramsdellite Titanates as Possible New Negative Electrode Materials for Li Batteries", Journal of the Electrochemical Society, 1999, pp. 4348-4353, vol. 146, No. 12.

Ma, S. et al., "Preparation of Fe Doped $Li_2Ti_3O_7$ and its Electrochemical Properties", Electrochemistry, 2001, pp. 526-529, vol. 69, Abstract only.

Robertson, A.D., et al. "$Li_{1+x}Fe_{1-3x}Ti_{1+2x}O_4$ ($0.0 \leqq x \leqq 0.33$) Based Spinels: Possible Negative Electrode Materials for Future Li-Ion Batteries", Journal of the Electrochemical Society, 1999, pp. 3958-3962, vol. 146, No. 11, Search Report.

Patent Abstract of Japan, vol. 2000, No. 24, May 11, 2001 & JP 2001 185141A, Jul. 6, 2001, Search Report.

* cited by examiner

NEGATIVE ELECTRODE FOR LITHIUM BATTERIES

This application is a National Stage application of International Application No. PCT/EP2004/004503, filed Apr. 26, 2004, which claims the benefit of U.S. Provisional Application No. 60/470,209, filed May 14, 2003, and which claims priority to European Patent Application No. 03291107.5, filed May 9, 2003. The entire contents of these applications are hereby incorporated herein by reference in their entireties.

This invention relates to lithium rechargeable batteries. More particularly the present invention relates to active material for the negative electrode of secondary rechargeable batteries, wherein the active material is based on lithium titanium iron ramsdellite oxide with one or two of the following elements: $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, $Sb^{5+}$. Performances, high energy and high specific power have been improved respecting security and environment with a reasonable cost.

Anode materials for rechargeable lithium batteries are generally selected from carbon group. In these batteries, numerous efforts have been made to find alternative electrochemical active anode materials to replace graphite. Notably, lithium titanium oxides have been proposed, due to an average voltage around 1.5V vs. Li, such as the spinel phase $Li_4Ti_5O_{12}$ as related in Journal of Electrochemical Society 141 (1994) L147, or the ramsdellite phase $Li_2Ti_3O_7$ as reported in Material Research Bulletin 32 (1997) 993. The spinel structure inserts lithium in a two-phase process due to the spinel to rocksalt phase transition presenting a 1.55V vs. Li plateau, whilst the ramsdellite inserts lithium topotactically in a solid solution with a flat S-shape charge-discharge curve corresponding to a one-phase process at a voltage range of 1-2V vs. Li.

Lithium titanate oxide ($Li_2Ti_3O_7$) is regarded as promising negative electrode material because of the low cost of the production, and non-toxicity of titanium, as reported in Solid State Ionics 83 (1996) 323 and in Journal of the Electrochemical Society 146 (1999) 4348. The reversible capacities, as reported in Solid State Ionics 83 (1996) 323, J. Electrochemical Society 146 (1999) 4348, J. Power Sources 81 (1999) 85, are between 100 and 140 Ah/kg but always for low current densities. In addition, these papers show that the reversible capacity, the polarisation observed upon lithium insertion and the required high temperature for the firing process strongly limit the application field of this compound.

As shown recently in Electrochemistry 69 (2001) 526, a lower temperature for the synthesis and a better cyclability at low current density can be achieved using a ceramic route, by substitution of a small amount of $Ti^{4+}$ by $Fe^{3+}$ in $Li_2Ti_3O_7$. However, the first discharge curve shows a plateau due to the transformation $Fe^{3+}/Fe^{2+}$ which limits the reversible capacity, and the other performances are not improved compared with $Li_2Ti_3O_7$.

The objective of the invention is to provide for a negative electrode active material for lithium batteries that has an increased capacity at high current density, in the range 1-2V, and has a high capacity retention after cycling compared to the prior art Li—Ti—(Fe)—O compounds, and can be prepared with a fast, low temperature and low-cost process.

The negative electrode active material for lithium battery according to the invention is represented by a general formula $Li_{2+v}Ti_{3-w}Fe_xM_yM'_zO_{7-\alpha}$, where M and M' have been chosen in order to improve the electrochemical performances, including both the electronic and the ionic conductivities. M and M' are metal ions having an ionic radius between 0.5 and 0.8 Å and forming an octahedral structure with oxygen; and α is related to the formal oxidation numbers n and n' of respectively M and M' by the relation $2\alpha=-v+4w-3x-ny-n'z$ and $-0.5 \leq v \leq 0.5$, $0 \leq w \leq 0.2$, $x>0$, $y+z>0$, $x+y+z \leq 0.7$. Preferably $x \leq 0.2$, $y \leq 0.2$ and $z \leq 0.1$. Due to their ionic radii and their electronic configurations the following distinct ions are considered for M and M': $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, $Sb^{5+}$. Preferably, $y>0$ and M=$Ni^{2+}$ and/or $z>0$ and M'=$Co^{2+}$ or $Cu^{2+}$. In another embodiment $y>0$ and M=$Ni^{2+}$ and/or $z>0$ and M'=$Al^{3+}$, $In^{3+}$, $Sn^{4+}$ or $Sb^{3+}$.

The invention also describes a method of manufacturing a negative electrode active material as specified above, comprising the steps of grinding and mixing a lithium compound, a titanium compound, an iron compound, and a M and M' compound by planetary ball milling, followed by a sintering process. In this method, each metallic compound can be selected from a metal oxide or an inorganic or organic solid precursor of said metal oxide.

The following oxides are considered: lithium oxide ($Li_2O$), titanium oxide (anatase $TiO_2$), iron oxide ($Fe_2O_3$), and one or two metal oxides (M/M') selected from $Ti_2O_3$, CoO, $Co_2O_3$, NiO, $Ni_2O_3$, CuO, MgO, $Al_2O_3$, $In_2O_3$, $SnO_2$, $Sb_2O_3$, $Sb_2O_5$. Preferably the temperature of the sintering process is between 150° C. and 1000° C.

In a further embodiment of the invention a secondary rechargeable battery is claimed, having an anode material as described above. The cathode material can be a high voltage positive material such as $LiCoO_2$, $LiMn_2O_4$ or a lithium intercalated compound.

Features of the invention are disclosed in the following detailed description and accompanying figures.

Figure 5:
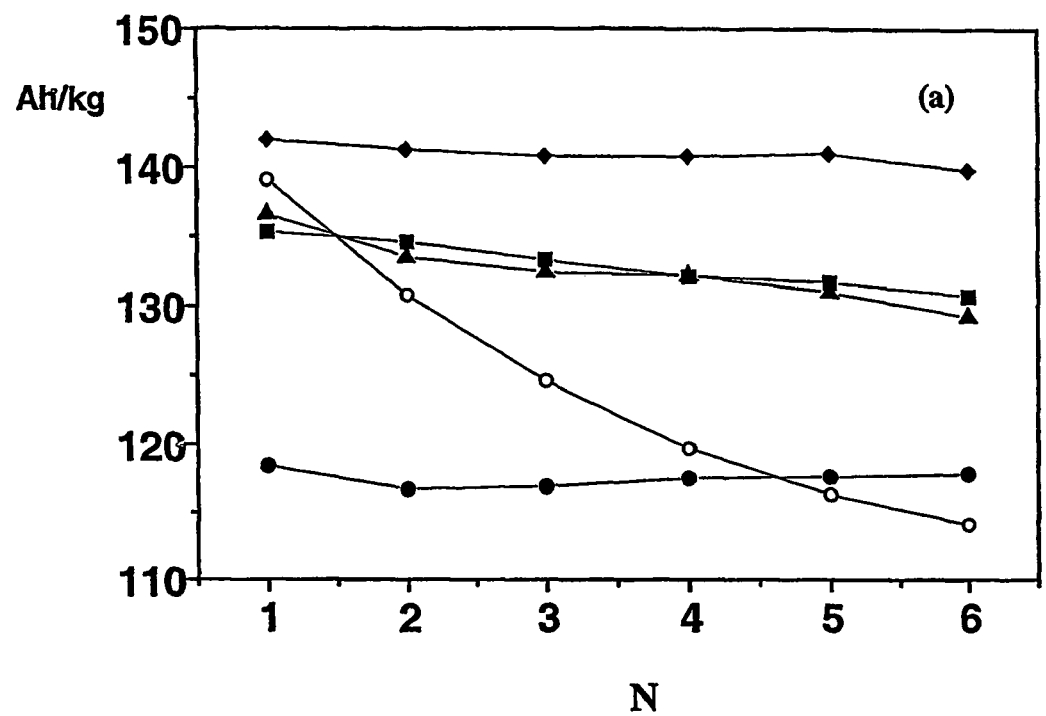
Figure 5:
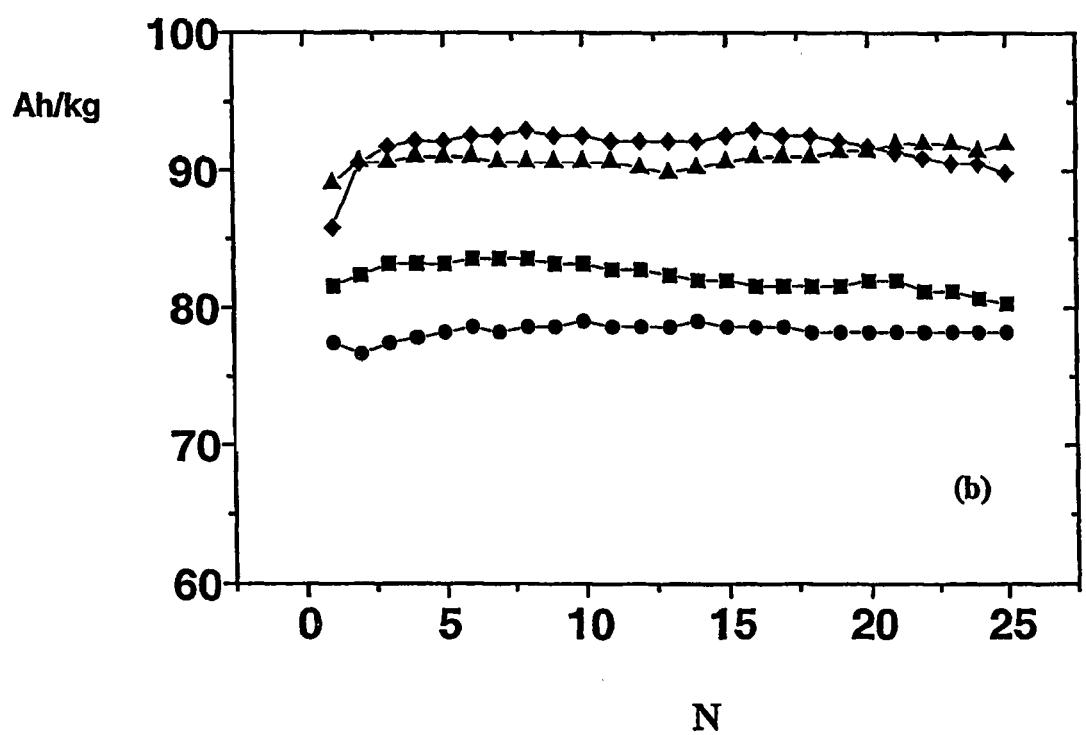

FIG. 5 shows variations of discharge capacity with the cycle number (capacity in Ah/kg against cycle number N) of $Li_{1.86}Ti_{2.85}Fe_{0.15}O_{6.85}$ (circles ●), $Li_{1.86}Ti_{2.85}Fe_{0.03}Ni_{0.12}O_{6.795}$ (squares ■), $Li_{1.93}Ti_{2.85}Fe_{0.03}Ni_{0.09}Sn_{0.03}O_{6.86}$ (triangles ▲) and $Li_{1.86}Ti_{2.86}Fe_{0.025}Ni_{0.1}Al_{0.025}O_{6.825}$ (diamonds ◆) at C/10 (a) and 1.5 C (b) rates. The capacity curve of $Li_2Ti_3O_7$ at C/10 is also shown for comparison (open circles ○).

Electrochemical properties of the ramsdellite $Li_2Ti_3O_7$ used as negative electrode in Li-ion batteries are based on a one-phase insertion mechanism of lithium ions, without modifications of the host compound. Such a mechanism requires a good stability of the host network, vacant sites for the inserted lithium, and the existence of electrochemical active cations, in this case $Ti^{4+}$. The structure of $Li_2Ti_3O_7$ can be described from $TiO_6$ edge and face sharing octahedra and channels, which are partially occupied by the lithium atoms of the host material (2 Li for 7 O). These channels can be easily filled by electrochemically inserted lithium ions. The crystallographic sites of titanium are not fully occupied and vacancies (0.5 vacancy for 7 O) can be occupied by the lithium of the host material. This description can be summarised by the developed formula of $Li_2Ti_3O_7$:

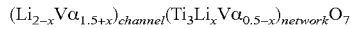

$$(Li_{2-x}V\alpha_{1.5+x})_{channel}(Ti_3Li_xV\alpha_{0.5-x})_{network}O_7$$

where $V\alpha$ denotes the vacancies. Substitution of $Ti^{4+}$ by $Fe^{3+}$ is known to decrease the synthesis temperature of the ramsdellite phase within the system $Li_2O$—$TiO_2$—$Fe_2O_3$. In addition to iron atoms the invention describes the addition of one or two other elements in order to improve the electrochemical performances. The following improvements are obtained:
- increase of the specific capacity by increasing the number of possible sites for the inserted lithium or by making easier the accessibility of the existing vacant sites;
- increase of the efficiency and the cycling through a better stability of the host network and by improving the reversibility of the lithium insertion mechanism (increase of the ionic conductivity);
- increase of the charge/discharge rate by increasing ionic and electronic conductivities in order to increase the specific power.

Co-doping is proposed in order to modify these different properties simultaneously by considering different elements and different oxidation states. The ions $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^3$, $Sb^{5+}$ have been considered because they have ionic radii between 0.5 Å and 0.8 Å, which is similar to those of $Li^+$ (0.6 Å) and $Ti^{4+}$ (0.7 Å). Thus, they can easily replace $Ti^{4+}$ or $Li^+$. In addition, they easily form octahedra with oxygen atoms. Two types of substitution are possible:

1) Ti Substitution

Transition metals such as $Co^{2+}$, $Ni^{2+}$, $Cu^{2+}$ can be associated with iron in order to avoid the plateau in the electrochemical potential curves at about 2.1V due to the $Fe^{3+}/Fe^{2+}$ reduction. The decrease of the cationic average charge (from +4) with $Ti^{3+}$, $Co^{2+/3+}$, $Fe^{2+/3+}$, $Ni^{2+/3+}$ and $Cu^{2+}$ increases the number of oxygen vacancies and the ionic conductivity.

The p-type elements $Al^{3+}$, $In^{3+}$, $Sn^{4+}$ and $Sb^{3+}$ increase the covalency of the metal-oxygen bonds modifying the volume of both the occupied and vacant sites and the effective charges of the oxygen anions. The $Sb^{5+}$ ions increase the cationic average charge and therefore the number of vacant cationic sites.

2) Li Substitution

The occupation of the lithium sites of the channels by $Mg^{2+}$, $Ni^{2+}$, which have higher oxidation states than $Li^+$, tends to decrease the number of lithium ions in the channels of the host material.

$Li_{2+v}Ti_{3-w}Fe_xM_yM'_zO_{7-\alpha}$ compounds according to the invention can be prepared using a ceramic process. Various amounts of lithium, titanium, iron and metals M and/or M' are selected using lithium oxide ($Li_2O$), titanium oxide (anatase $TiO_2$), iron oxide ($Fe_2O_3$), and M/M' oxides ($Ti_2O_3$, CoO, $Co_2O_3$, NiO, $Ni_2O_3$, CuO, MgO, $Al_2O_3$, $In_2O_3$, $SnO_2$, $Sb_2O_3$, $Sb_2O_5$) as starting materials, which are finely ground and mixed by planetary ball milling, using for example a Fritsch Pulverisette 7 (15 min., speed 8), and a milling ball weight which is 10 times the product weight. Inorganic or organic solid precursors of oxides can also be used instead of oxides. The firing or sintering process involves for example a five step temperature profile including a linear increase of temperature from room temperature to 150° C. at 5° C./min., a plateau at 150° C. during 1 hour, a linear increase of temperature from 150° C. to 650° C. at 2° C./min., a linear increase of temperature from 650° C. to 980° C. at 7° C./min., and a subsequent firing plateau at 980° C. for 2 hours. As a higher temperature is required in the last step (1080° C.) for non-doped $Li_2Ti_3O_7$, the effect of iron or co-doping is clearly to reduce this temperature, which is interesting in an industrial process.

The preparation process according to the invention is illustrated in the following examples. Example 1 concerns $Li_{1.86}Ti_{2.85}Fe_{0.03}Ni_{0.12}O_{6.795}$ which is obtained from the general formula $Li_{2+v}Ti_{3-w}Fe_xM_yM'_zO_{7-\alpha}$ by considering v=−0.14, w=0.15, x=0.03, y=0.12, z=0. The material was synthesised using the ceramic process described above: a mixture of $Li_2CO_3$ (448 mg), $TiO_2$ (1.487 g), $Fe_2O_3$ (15.6 mg), NiO (58.5 mg) was finely ground by planetary ball milling in the Fritsch Pulverisette 7 and mixed. The firing process involved the 5 step temperature profile described above.

Example 2 concerns $Li_{1.93}Ti_{2.85}Fe_{0.03}Ni_{0.09}Sn_{0.03}O_{6.86}$ which is obtained from the general formula $Li_{2+v}Ti_{3-w}Fe_xM_yM'_zO_{7-\alpha}$ by considering v=−0.07, w=0.15, x=0.03, y=0.09, z=0.03. A mixture of $Li_2CO_3$ (465 mg), $TiO_2$ (1.487 g), $Fe_2O_3$ (15.6 mg), NiO (43.7 mg), $SnO_2$ (29.5 mg) was finely ground by planetary ball milling and mixed. The firing process described above was used.

Example 3 concerns $Li_{1.86}Ti_{2.86}Fe_{0.025}Ni_{0.1}Al_{0.025}O_{6.825}$ which is obtained from the general formula $Li_{2+v}Ti_{3-w}Fe_xM_yM'_zO_{7-\alpha}$ by considering v=−0.14, w=0.14, x=0.025, y=0.1, z=0.025. A mixture of $Li_2CO_3$ (447 mg), $TiO_2$ (1.487 g), $Fe_2O_3$ (13 mg), NiO (48.6 mg), $Al_2O_3$ (8.3 mg) was finely ground and mixed, followed by the firing process described before.

Figure 1:
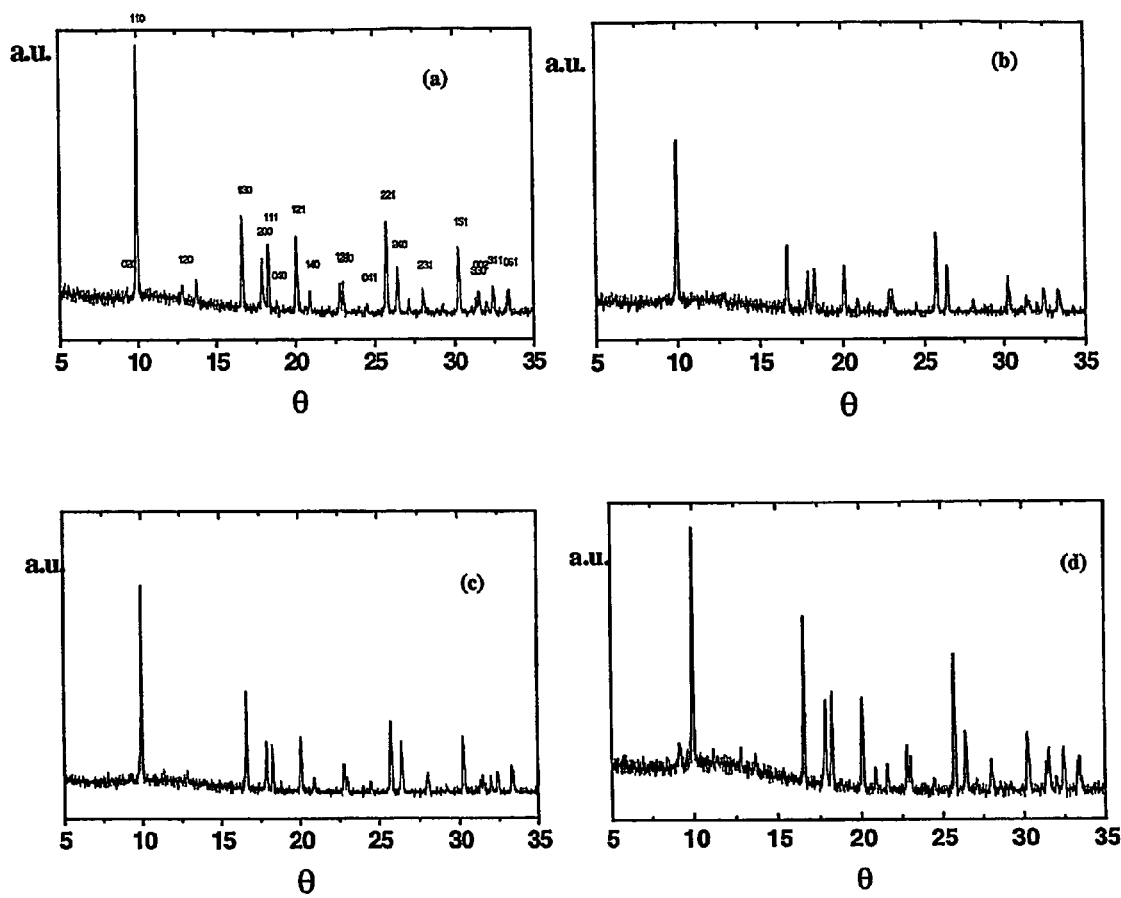
FIG. 1 shows X-ray diffraction patterns (Cu Kα—Intensity a.u. against angle θ) of $Li_{1.86}Ti_{2.85}Fe_{0.15}O_{6.85}$ (a), $Li_{1.86}Ti_{2.85}Fe_{0.03}Ni_{0.12}O_{6.795}$ (b), $Li_{1.93}Ti_{2.85}Fe_{0.03}Ni_{0.09}Sn_{0.03}O_{6.86}$ (c) and $Li_{1.86}Ti_{2.86}Fe_{0.025}Ni_{0.1}Al_{0.025}O_{6.825}$ (d) prepared by the ceramic process.

X-ray diffraction analysis of the obtained $Li_{2+v}Ti_{3-w}Fe_xM_yM'_zO_{7-\alpha}$ a shows a ramsdellite-related structure. This is shown in FIG. 1 for $Li_{1.86}Ti_{2.85}Fe_{0.15}O_{6.85}$ with lattice constants a=0.5014(3) nm, b=0.9556(4) nm, c=0.294(2) nm (1a), for $Li_{1.86}Ti_{2.85}Fe_{0.03}Ni_{0.12}O_{6.795}$ with lattice constants a=0.501(2) nm, b=0.9572(6) nm, c=0.295(7) nm (1b) for $Li_{1.93}Ti_{2.85}Fe_{0.03}Ni_{0.09}Sn_{0.03}O_{6.86}$ with lattice constants a=0.502(2) nm, b=0.9572(6) nm, c=0.295(7) nm (1c) and for $Li_{1.86}Ti_{2.86}Fe_{0.025}Ni_{0.1}Al_{0.025}O_{6.825}$ with lattice constants a=0.502(3) nm, b=0.9569(4) nm, c=0.295(6) nm (1d). Substitution of Li and Ti by M/M' elements does not modify the crystal structure which is always of the ramsdellite type, and only weakly affects the lattice constants.

In order to study the electrochemical properties of $Li_{2+v}Ti_{3-w}Fe_xM_yM'_zO_{7-\alpha}$, powders according to the invention, carbon black as an electron conducting and stabilising material, and PVDF as a binder were pressed onto pellets. A two-electrode cell was made from that mixture as cathode and a lithium foil as anode. A mixture solution of ethylene carbonate and diethyl carbonate (1:1) including 1M of $LiPF_6$ was used as electrolyte.

Figure 2:
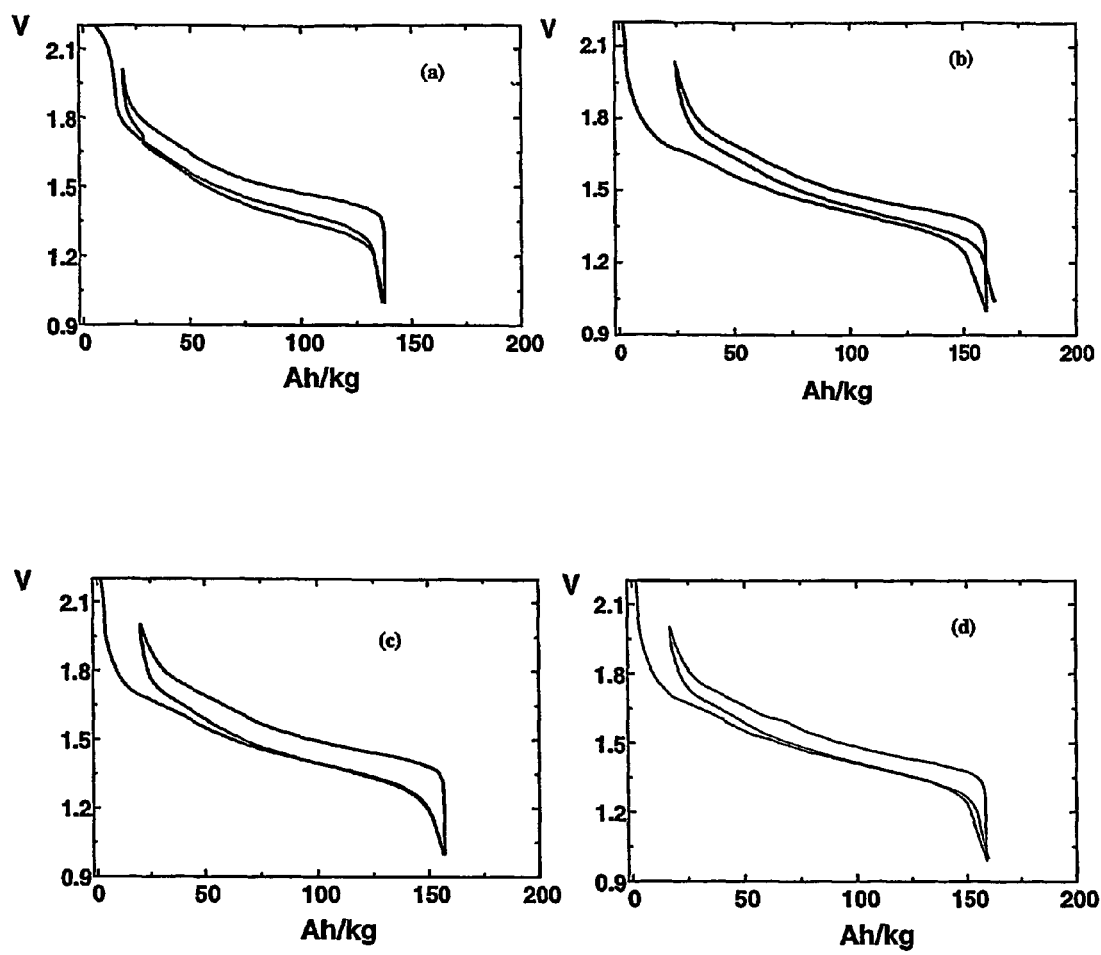
FIG. 2 shows the charge and discharge profiles (potential in V against capacity in Ah/kg) in the range 1-2.2V of $Li_{1.86}Ti_{2.85}Fe_{0.15}O_{6.85}$ (a), $Li_{1.86}Ti_{2.85}Fe_{0.03}Ni_{0.12}O_{6.795}$ (b), $Li_{1.93}Ti_{2.85}Fe_{0.03}Ni_{0.09}Sn_{0.03}O_{6.86}$ (c) and $Li_{1.86}Ti_{2.86}Fe_{0.025}Ni_{0.1}Al_{0.025}O_{6.825}$ (d).

FIG. 2 shows the charge-discharge characteristics of prior art $Li_{1.86}Ti_{2.85}Fe_{0.15}O_{6.85}$ (2a) $Li_{1.86}Ti_{2.85}Fe_{0.03}Ni_{0.12}O_{6.795}$ of Example 1 (2b), $Li_{1.93}Ti_{2.85}Fe_{0.03}Ni_{0.09}Sn_{0.03}O_{6.86}$ of Example 2 (2c) and $Li_{1.86}Ti_{2.86}Fe_{0.025}Ni_{0.1}Al_{0.025}O_{6.825}$ of Example 3 (2d). The charge-discharge tests were carried out under galvanostatic mode at a current rate of C/10 (C corresponds to 1 mole Li exchanged, per mole active material, per hour) in the potential range 1-2.2V.

Figure 3:
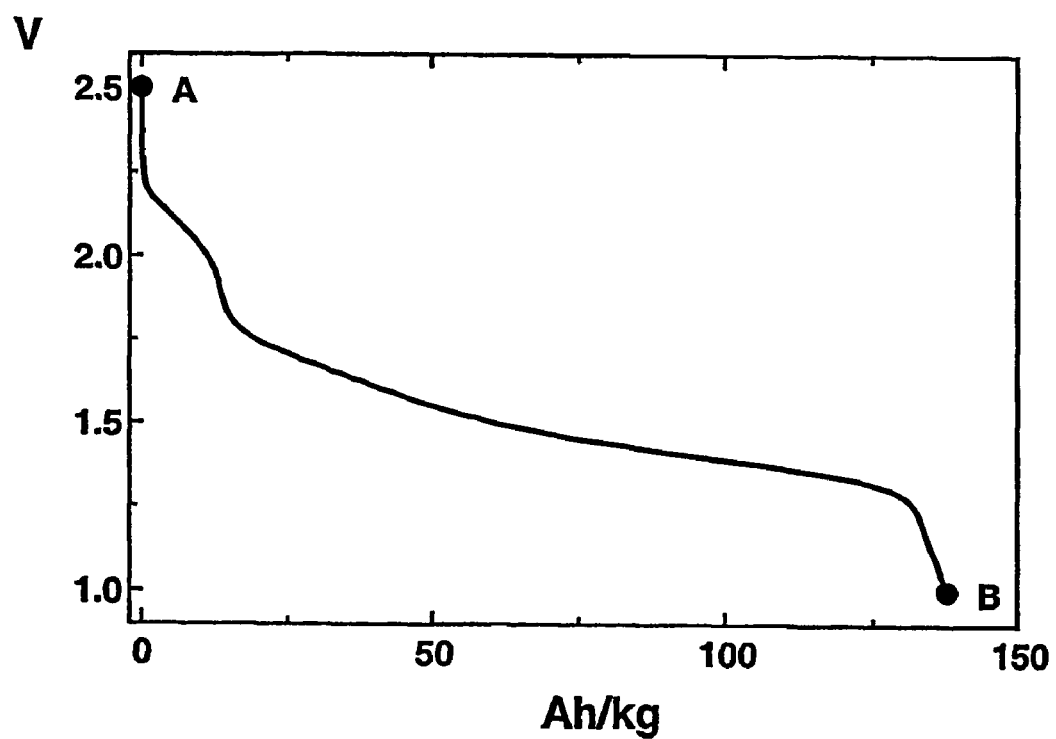
FIG. 3 shows the first discharge curve (potential in V against capacity in Ah/kg) of prior art compound $Li_{1.86}Ti_{2.85}Fe_{0.15}O_{6.85}$ in the range 1-2.5V. The points A and B denote the host material and the lithiated compound at the end of the first discharge, respectively, which are considered for the analysis of the iron oxidation state by $^{57}Fe$ Mössbauer spectroscopy in FIG. 4.
Figure 4:
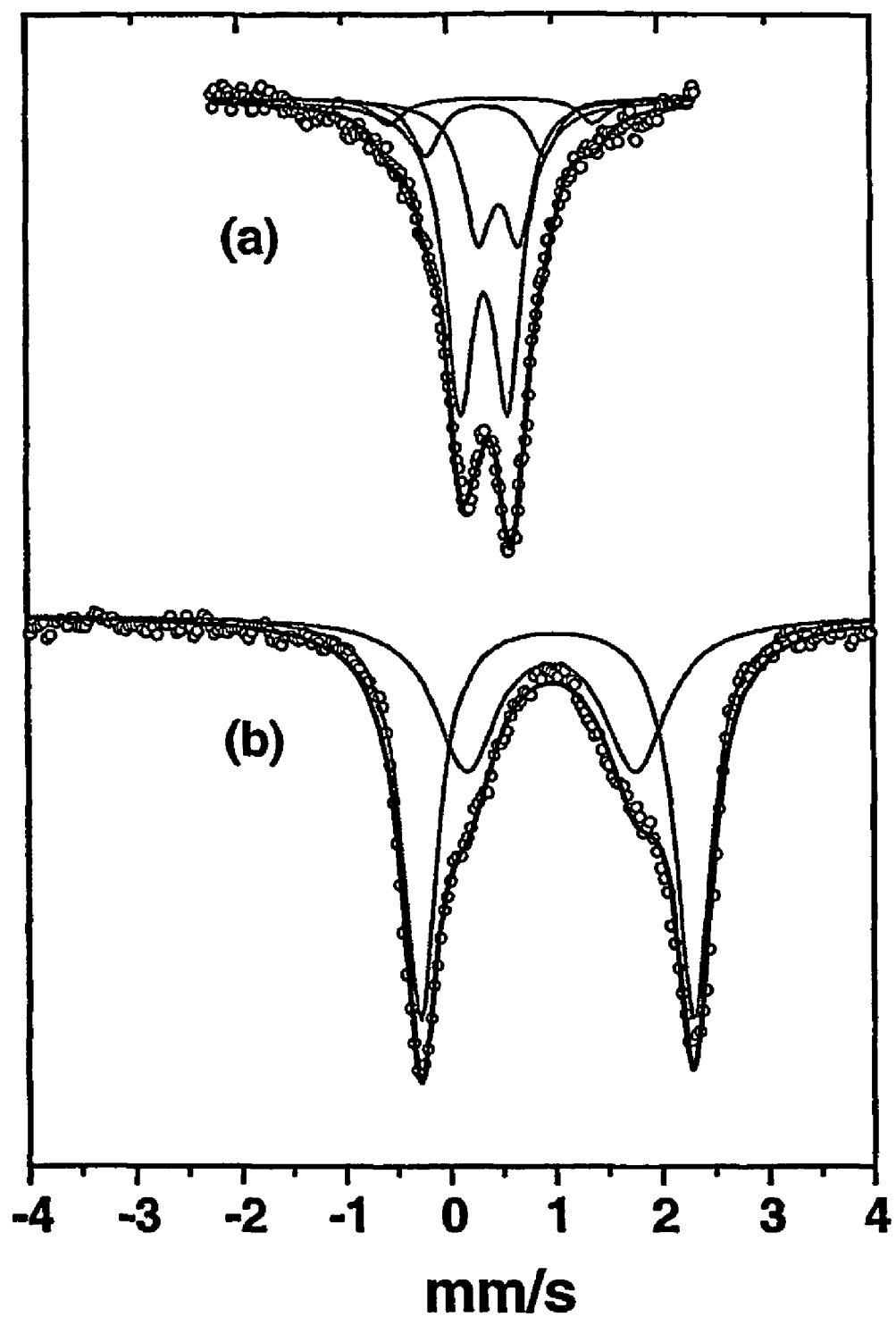
FIG. 4 shows $^{57}Fe$ Mössbauer spectra of prior art compound (relative transmission against velocity in mm/s) $Li_{1.86}Ti_{2.85}Fe_{0.15}O_{6.85}$ (a) and the lithiated compound at the end of the first discharge (b) which correspond to the points A and B of the electrochemical curve given in FIG. 3, respectively.

The observed plateau at about 2.1V for prior art $Li_{1.86}Ti_{2.85}Fe_{0.15}O_{6.85}$ (see FIGS. 2a, 3) is due to the reduction reaction of $Fe^{3+}$ into $Fe^{2+}$ as shown by comparison between Mössbauer spectra for the host material (FIG. 4a) and the lithiated material at the end of the first discharge (FIG. 4b). To avoid the $Fe^{3+}/Fe^{2+}$ reduction during lithium insertion, which reduces the capacity of the material, according to the invention additional oxides of M and/or M' are included during the synthesis of the host material. Addition of M and/or M' changes $Fe^{3+}$ into $Fe^{2+}$ in the host material and eliminates the plateau at 2.1V as can be observed in FIGS. 2b and 2c.

The charge-discharge curves of the three co-doped compounds shown in FIG. 2 present a total capacity of about 160 Ah/kg in the range 1-2V. There is a small irreversible capacity of less than about 25 Ah/kg at the first discharge and the reversible capacity of is of about 140 Ah/kg (FIGS. 2b, 2c, 2d) which is higher than that obtained for the iron doped material: 120 Ah/kg (FIG. 2a).

Variations of discharge capacity with the cycle number of $Li_{1.86}Ti_{2.85}Fe_{0.15}O_{6.85}$, $Li_{1.86}Ti_{2.85}Fe_{0.03}Ni_{0.12}O_{6.795}$, $Li_{1.93}Ti_{2.85}Fe_{0.03}Ni_{0.09}Sn_{0.03}O_{6.86}$, $Li_{1.86}Ti_{2.86}Fe_{0.025}Ni_{0.1}Al_{0.025}O_{6.825}$ are shown at C/10 (FIG. 5a) and 1.5 C (FIG. 5b) rates. Both $Li_{1.93}Ti_{2.85}Fe_{0.03}Ni_{0.09}Sn_{0.03}O_{6.86}$ and $Li_{1.86}Ti_{2.86}Fe_{0.025}Ni_{0.1}Al_{0.025}O_{6.825}$ show good cycling capabilities and reversible capacities of about 140 Ah/kg and 90 Ah/kg at C/10 and 1.5 C rates, respectively. Similar results are obtained for $Li_{1.86}Ti_{2.85}Fe_{0.03}Ni_{0.12}O_{6.795}$ at C/10 but not at 1.5 C whereas capacities of the iron compound are lower at both C/10 (120 Ah/kg) and 1.5 C (75 Ah/kg). It is interesting to note that undoped $Li_2Ti_3O_7$ exhibits poor cycling capabilities as shown in FIG. 5a for comparison. For the co-doped compounds the retention of capacity is better than 90% after 30 cycles.

As a conclusion, the main advantages of co-doping according to the invention are the decrease of the synthesis temperature, the good reversible capacity at both low and high current densities and the good cycling capabilities.

The invention claimed is:

1. A negative active material for a lithium battery, having a general formula $Li_{2+v}Ti_{3-w}Fe_xM_yM'_zO_{7-\alpha}$, wherein M and M' are metal ions having an ionic radius between 0.5 and 0.8 Å and forming an octahedral structure with oxygen; and α is related to the formal oxidation numbers n and n' of M and M' by the relation $2\alpha=-v+4w-3x-ny-n'z$ and $-0.5 \leq v \leq 0.5$, $0 \leq w \leq 0.2$, $x>0$, $y+z>0$ and $x+y+z \leq 0.7$.

2. The active material of claim 1, wherein M and M' are selected from the list consisting of $Ti^{3+}$, $Co^{2+}$, $Co^{3+}$, $Ni^{2+}$, $Ni^{3+}$, $Cu^{2+}$, $Mg^{2+}$, $Al^{3+}$, $In^{3+}$, $Sn^{4+}$, $Sb^{3+}$, $Sb^{5+}$.

3. The active material of claim 2, wherein y>0 and M is $Ni^{2+}$.

4. The active material of claim 2, wherein z>0 and M' is $Co^{2+}$ or $Cu^{2+}$.

5. The active material of claim 2, wherein z>0 and M' is selected from the list consisting of $Al^{3+}$, $In^{3+}$, $Sn^{4+}$ or $Sb^{3+}$.

6. The active material of claim 1, wherein $x \leq 0.2$, $y \leq 0.2$ and $z \leq 0.1$.

7. A method of manufacturing a negative electrode active material according to claim 1, comprising the steps of grinding and mixing a lithium compound, a titanium compound, an iron compound, and a M and M' compound by ball milling, followed by a sintering process.

8. The method of claim 7, wherein each metallic compound is selected from a metal oxide or an inorganic or organic solid precursor of said metal oxide.

9. The method of claim 7, wherein the temperature of the sintering process is between 150° C. and 1000° C.

10. A secondary rechargeable battery having an anode material according to claim 1.

11. The active material of claim 3, wherein z>0 and M' is $Co^{2+}$ or $Cu^{2+}$.

12. The active material of claim 3, wherein z>0 and M' is selected from the list consisting of $Al^{3+}$, $In^{3+}$, $Sn^{4+}$ or $Sb^{3+}$.

* * * * *